United States Patent [19]
Dobner

[11] Patent Number: 5,969,793
[45] Date of Patent: Oct. 19, 1999

[54] TRANSFER AND CENTERING SYSTEM FOR CONTACT LENSES

[75] Inventor: Michael H. Dobner, Penfield, N.Y.

[73] Assignee: Bausch & Lomb Incorporated, Rochester, N.Y.

[21] Appl. No.: 09/094,968

[22] Filed: Jun. 12, 1998

Related U.S. Application Data

[60] Provisional application No. 60/050,158, Jun. 19, 1997.
[51] Int. Cl.⁶ ....................................................... A61B 3/00
[52] U.S. Cl. ............................................................ 351/247
[58] Field of Search ................................... 351/200, 247, 351/160 R, 177, 178; 53/54, 251, 252, 473

[56] References Cited

U.S. PATENT DOCUMENTS

| 5,347,896 | 9/1994 | Jones | 82/125 |
| 5,378,412 | 1/1995 | Smith et al. | 264/2.1 |
| 5,503,515 | 4/1996 | Moorehead | 414/755 |
| 5,561,970 | 10/1996 | Edie et al. | 53/473 |
| 5,687,541 | 11/1997 | Martin et al. | 53/54 |

Primary Examiner—George Manuel
Attorney, Agent, or Firm—Mary Anne Magee; John E. Thomas

[57] ABSTRACT

A method for transferring a lens-shaped article from a first support to a centered position on a second support employs a transfer tool having a slideable plunger and plunger sleeve that cooperates with the first and second support to ensure that the article is oriented in a desired manner when transferred.

20 Claims, 4 Drawing Sheets

TRANSFER AND CENTERING SYSTEM FOR CONTACT LENSES

This application claims benefit of U.S. Provisional Application Ser. No. 60/050,158 filed Jun. 19, 1997.

BACKGROUND OF THE INVENTION

The present invention relates to a method and apparatus for transferring a lens-shaped article between different stages of a manufacturing process, while ensuring that the article remains centered during the transfer. The invention is especially useful for transferring contact lenses.

Small, delicate work pieces such as contact lenses are difficult to transfer through multiple stages of a manufacturing process. This is especially true if it is desired to maintain the contact lens in a desired orientation, such as in a centered position during the manufacturing process. Even though automated processes minimize human contact with the lenses thus reducing the chance of human error, the challenge is designing processes that ensure that the lens is properly oriented when transferred between stages.

SUMMARY OF THE INVENTION

The invention provides a method for transferring a lens-shaped article from a first support to a centered position on a second support. The invention provides a reliable mechanism for ensuring that the article remains centered during the transfer between manufacturing stages, either for fully automated manufacturing stages or manufacturing stages assisted with an operator. Additionally, the invention provides an apparatus for carrying out the various preferred embodiments.

The method of this invention involves removing the lens-shaped article from the first support with a transfer tool such that the article is centered with respect to the transfer tool, and transferring the article to a centered position on the second support receiving surface. The transfer tool comprises a plunger comprising an elongated body, a tip at a lower end of the elongated body that includes a contacting surface, a conduit extending through the elongated body that is connected to a vacuum source and terminating at an opening in the contacting surface of the tip, and a sleeve surrounding the elongated body of the plunger, the sleeve and plunger being slideable with respect to each other.

The article is removed from the first support by moving the plunger to an extended position with respect to the sleeve, positioning the tip near the concave article surface, and activating the vacuum source of the transfer tool. The article is transferred to a centered position on the second support receiving surface by moving the plunger to a retracted position with respect to the sleeve, placing the sleeve over a portion of the second support having an outer diameter generally corresponding to an inner diameter of the sleeve, and contacting the convex article surface with the receiving surface and inactivating the vacuum source of the transfer tool.

DETAILED DESCRIPTION OF PREFERRED EMBODIMENTS

Figure 1:
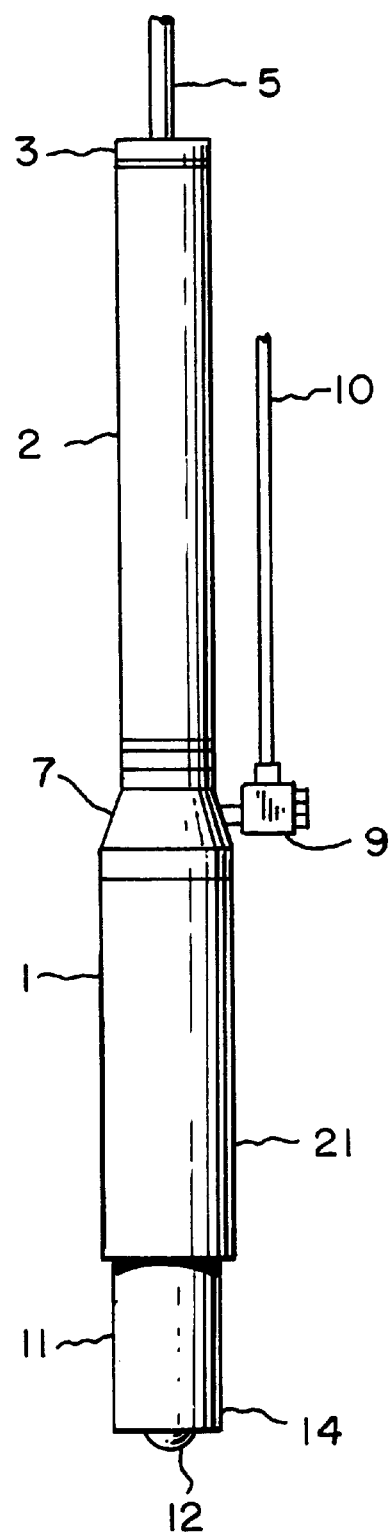
FIG. 1 is a schematic perspective view of a transfer tool according to various preferred embodiments.

Referring now to the drawings, there is seen in the various Figures a transfer and centering tool 1 which is used to transfer a lens-shaped article 23 from a first support to a centered position on a second support.

For the described illustrative embodiment, contact lens 23 is initially supported on and retained in mold 25, mold 25 being part of a mold assembly in which the lens was cast. For this embodiment, mold 25 and lens 23 are retained in a fixture designed for holding the mold/lens combination and for releasing the contact lens from the mold. The second support is part of an edging apparatus having a spindle arbor that holds the lens during the edging operation. However, it is understood that the transfer tool of this invention may be employed with other types of equipment employed in various lens manufacturing processes where it is desired to transfer the lens between substations while ensuring the lens is oriented in a desired, predetermined manner.

Figure 2:
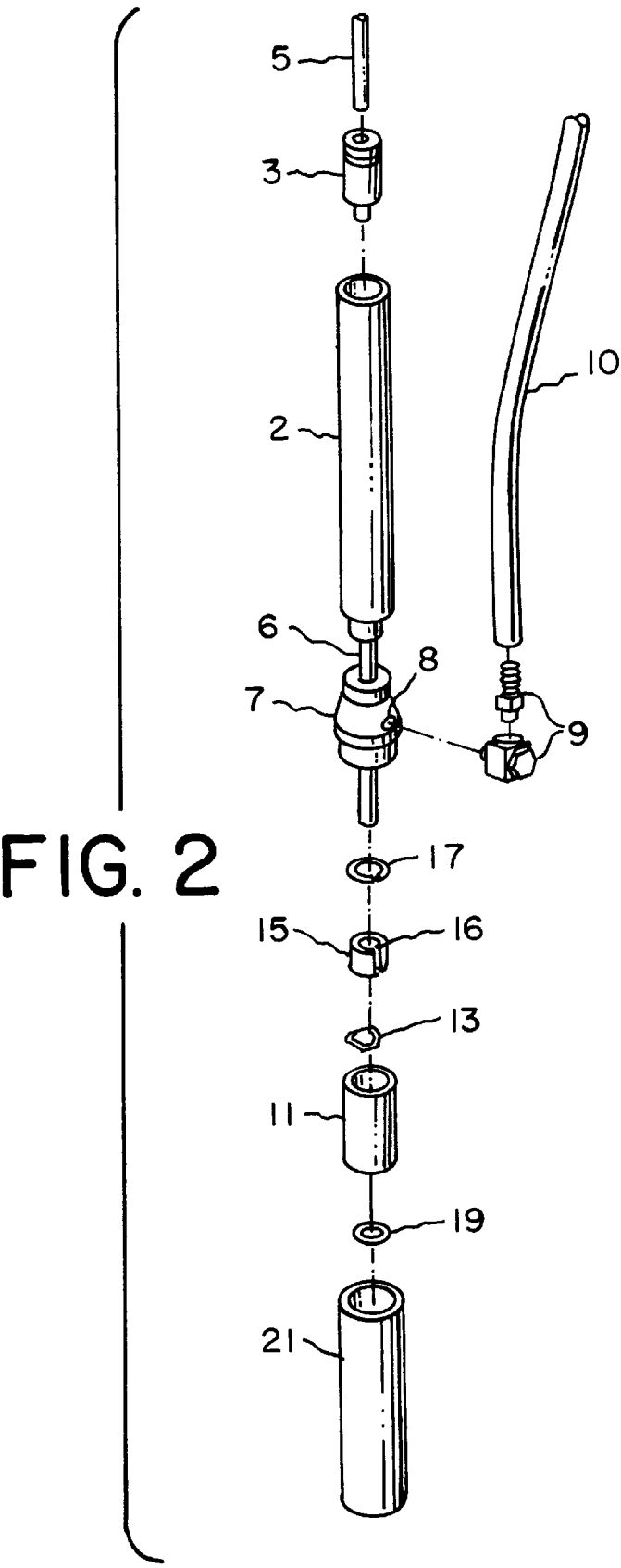
FIG. 2 is an exploded view of the transfer tool of FIG. 1.

As seen in FIGS. 1 and 2, transfer tool 1 includes plunger 11 and plunger sleeve 21. Plunger 11 and plunger sleeve 21 are slideable with respect to each other, more specifically, plunger 11 is movable between an extended position and a retracted position with respect to plunger sleeve 21 by means of a plunger actuator. (In FIG. 1, plunger 11 is in an extended position.) For the illustrated embodiment, the plunger actuator is a conventional spring-biased return air cylinder 2 having actuating rod 6, rod 6 extending and retracting to provide a stroke. Actuator 2 may be attached via connector 3 to tubing 5, and attached to plunger sleeve 21 via cylinder adapter 7. Tubing 5 leads to a pressurized air source for activating air cylinder 2. Plunger 11 includes tip 12 at its lower end for contacting the concave surface of the contact lens, as described in more detail below. The apparatus ftrther includes tubing 10 leading to a vacuum source which may be attached to cylinder adapter 7 via fitting 9.

Referring to FIG. 2, for the described embodiment, the top end of air cylinder 2 may include female threads for connection to male threads on connector 3, and the bottom end of air cylinder 2 may include male threads for connection to female threads on cylinder adapter 7 (the threaded connections not being shown in the drawings). Connector 3 has an opening for receiving tubing 5 which, as mentioned, is connected to a pressurized air source. Cylinder adapter 7 includes lateral opening 8 for connection to fitting 9.

The lower end of rod 6 may be connected to plunger 11 via connection elements such as spring washer 13, cylinder bushing 15, and retaining ring 17. For the illustrated embodiment, cylinder bushing 15 has a lateral groove 16 which, in conjunction with conduit 18 extending through the plunger elongated body, provides a conduit for the vacuum source to extend from tubing 10, through fitting 9 and plunger 11, to an opening from conduit 18 in tip 12. Bushing 15 is attached to rod 6, for example with a threaded connection. The internal retaining ring 17 locks into threads of plunger 11 to secure bushing 15 and washer 13, washer 13 permitting bushing 15 to float slightly with respect to plunger 11.

Plunger sleeve 21 may include female threads for connection to male threads on connector 3; accordingly, when the apparatus is assembled as in FIG. 1, sleeve 21 surrounds plunger 11. For the described embodiment, sleeve 21 remains in a fixed position with respect to connector 3 and adapter 7, while plunger 11 is slideable between extended and retracted positions by activation of rod 6.

Figure 3:
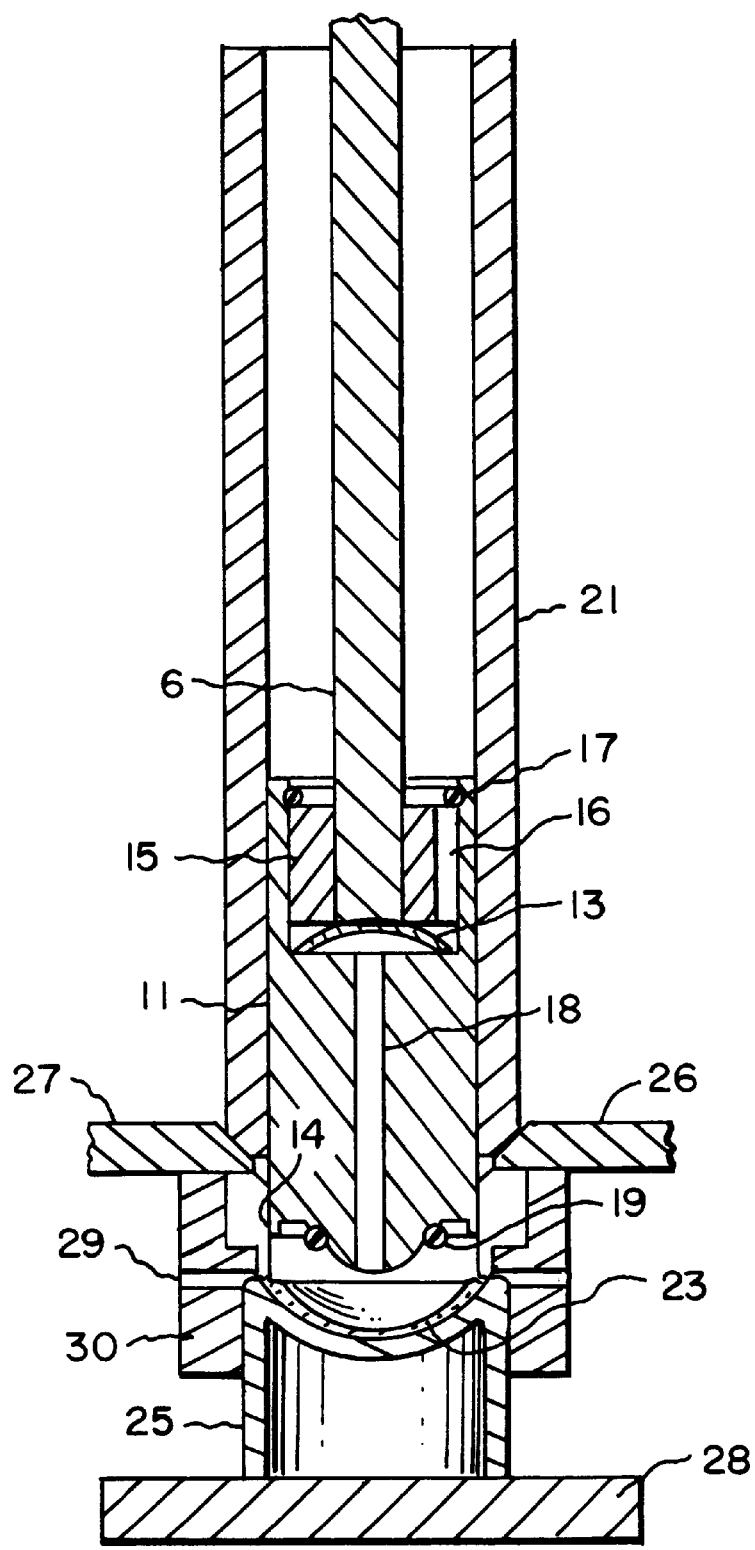
FIG. 3 is a partial cross-sectional view of the transfer tool with the plunger in an extended position.

The lower end of plunger 11 has tip 12, which preferably has the form of a convex, domed surface with an opening formed in this surface from conduit 18. An o-ring 19 may be placed around tip 12, whereby the concave surface of a contact lens 23 contacts tip 12 and o-ring 19 when it is contacted with plunger 11 (as seen in FIG. 3). This lower end of plunger 11 may include a small annulus 14 around it, to facilitate centering of the contact lens with respect to tip 12.

As mentioned, for the described embodiment, the contact lens is initially supported on mold 25 in which it was molded. Mold 25 is retained in a fixture for mechanically releasing contact lens 23 adhered to mold 25. This fixture includes a support 28 for the bottom portion of mold 25 and shear ring 27. When shear ring 27 applies pressure to mold 25 about the periphery of the contact lens to distort mold 25, the lens is mechanically released from the mold. As seen in FIG. 3, an upper portion of shear ring 27 extends above mold 25, and this ring-like member has an inner circumference that generally corresponds to an outer circumference of plunger 11; since mold 25 is centered with respect to shear ring 27 and lens 23 is centered with respect to mold 25, this ensures that plunger 11 is centered with respect to mold 25 (and lens 23) when it contacts the lens. This fixture may further include ring-like member 26 which serves to facilitate an operator guiding the plunger into the shear ring. The fixture may further include conduit 29, extending through body 30, for introducing pressurized air to mold 25 around the periphery of lens 23, as described in more detail below.

The second support to which the lens is transferred may be an apparatus for mechanically edging the lens, that includes arbor 31. Arbor 31 is mounted on a spindle shaft (not shown).

In operation, as illustrated in FIG. 3, plunger 11 is inserted into ring 27 of the dry release fixture with plunger 11 extended beyond the plunger sleeve 21. The lens 23 is mechanically released from the lens mold 25 and a puff of air is supplied via conduit 29 to assist in lifting the lens from mold 25. The vacuum source connected via tubing 10 is activated so that a vacuum is created at the opening in tip 12 in contact with the lens, and the lens is then held onto the transfer tool plunger tip by maintaining the vacuum until the lens is transferred to the next station. As mentioned, plunger 11 is centered with respect to mold 25 and lens 23 when its tip is contacted with lens 23, and centering of the lens with respect to tip 12 is further facilitated by constraining the lens in the recess formed by annulus 14 that is slightly larger than the lens outside diameter.

Figure 4:
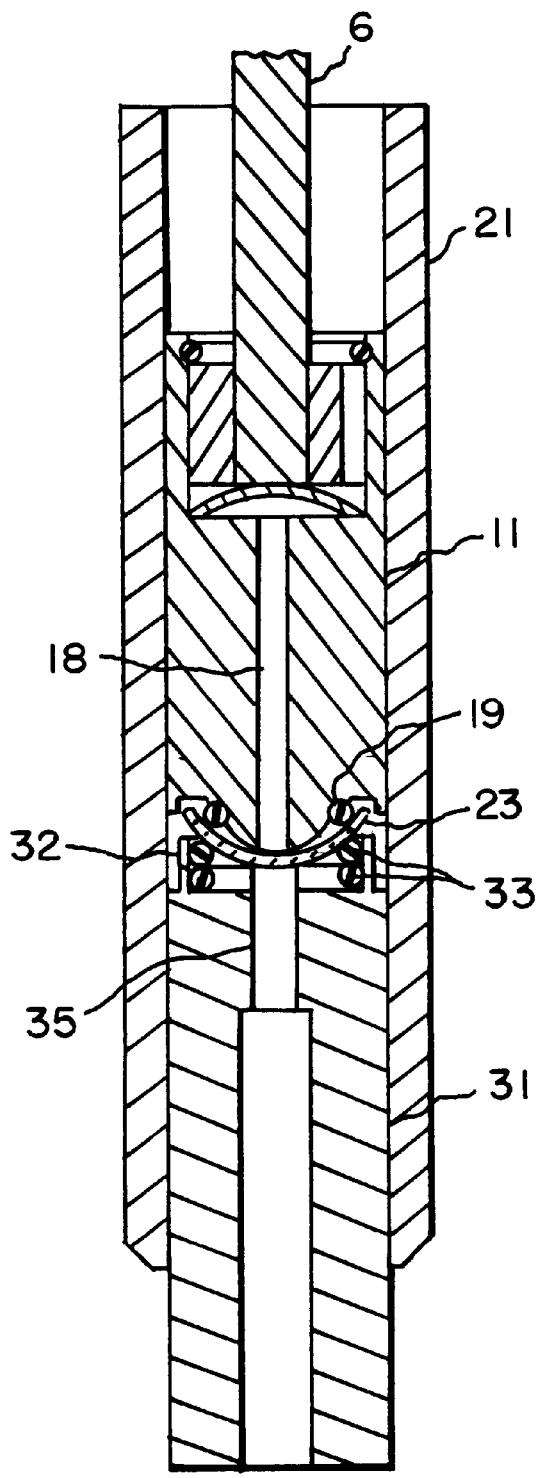
FIG. 4 is a partial cross-sectional view of this transfer tool with the plunger in a retracted position.

The transfer tool plunger 11 is then retracted inside the plunger sleeve 21. With the plunger retracted inside the plunger sleeve, sleeve 21 is slid over arbor 31, until it stops against o-ring 33, such that the combination has the configuration shown in FIG. 4. The outside diameter of the portion of arbor 31 that receives sleeve 21 generally corresponds to the inside diameter of sleeve 21. Accordingly, lens 23 is now centered with respect to arbor 31. For the described embodiment, arbor 31 further includes annulus 32 and o-rings 33 contained therein, the o-rings and annulus serving as a surface to receive the lens and further facilitate centering of the lens with respect to arbor 31. After the lens is seated on this arbor receiving surface, an arbor vacuum is activated (the arbor vacuum source not shown but being connected to conduit 35) to hold the lens in place. When sufficient vacuum is established to hold the lens on the arbor, a control system automatically deactivates the vacuum source of the transfer tool and activates air cylinder 2 to extend the plunger. The transfer tool is now ready for the next cycle, and the lens is ready for processing at the edger.

Various embodiments of the present invention are evident. As previously mentioned, the lens-shaped article may be transferred between any stations where accurate positioning of a lens is desired. As another example, in the described embodiment an operator manually positions the transfer tool between the first and second supports, but the transfer tool may be mounted on a machine so that the transfer is accomplished by robotics rather than by an operator. Other variations and embodiments will be evident to one skilled in the art.

I claim:

1. An apparatus for transferring a lens-shaped article from a first support to a centered position on a second support, wherein said lens-shaped article includes a concave surface and a convex surface, the first support includes a support surface for supporting the convex surface of the article and the second support includes a receiving surface for receiving the convex surface of the article, said apparatus comprising:

(a) a plunger comprising an elongated body, a tip at a lower end of the elongated body that includes a contacting surface, and a conduit extending through the elongated body, said conduit connected to a vacuum source and terminating at an opening in the contacting surface of the tip; and (b) a sleeve surrounding the elongated body of the plunger, said plunger and sleeve being slideable with respect to each other, wherein the second support includes a portion having an outer diameter generally corresponding to an inner diameter of the plunger sleeve.

2. The apparatus of claim 1, wherein the first support includes a ring-like member extending above the support surface that has an inner diameter generally corresponding to an outer diameter of the plunger body.

3. The apparatus of claim 1, wherein the first support includes a concave support surface that generally corresponds in shape to the convex surface of the lens-shaped article.

4. The apparatus of claim 3, wherein the first support includes a mold member in which the lens-shaped article was cast, such that the lens-shaped article is supported on a concave molding surface of the mold member and the ring-like member extends above and is centered with respect to the molding surface.

5. The apparatus of claim 1, wherein the second support includes a spindle arbor, such that the lens-shaped article is received on a receiving surface at an end of the arbor, and an outer diameter of the arbor body generally corresponds to the inner diameter of the plunger sleeve.

6. The apparatus of claim 5, wherein the receiving surface at the end of the arbor includes an O-ring for contacting the convex surface of the article.

7. The apparatus of claim 5, wherein the arbor receiving surface has an opening therein connected to an arbor vacuum source.

8. The apparatus of claim 1, wherein the tip contacting surface includes an O-ring for contacting the concave surface of the article.

9. The apparatus of claim 1, wherein the plunger is moveable with respect to the sleeve between a retracted position and an extended position.

10. The apparatus of claim 1, wherein the lens-shaped article is a contact lens.

11. A method of transferring a lens-shaped article from a first support to a centered position on a second support, said lens-shaped article including a concave surface and a convex surface, the first support including a support surface for supporting the convex surface of the article, and the second support including a receiving surface for receiving the convex surface of the article, said method comprising:

(a) removing the article from the first support with a transfer tool such that the article is centered with respect to the transfer tool, the transfer tool comprising a plunger comprising an elongated body, a tip at a lower end of the elongated body that includes a contacting surface, a conduit extending through the elongated body, said conduit connected to a vacuum source and terminating at an opening in the contacting surface of the tip, and a sleeve surrounding the elongated body of the plunger, the sleeve and plunger being slideable with respect to each other;

wherein the article is removed from the first support by positioning the tip near the concave article surface while the plunger is in an extended position with respect to the sleeve and activating the vacuum source of the transfer tool;

(b) transferring the article to a centered position on the second support receiving surface, by moving the plunger to a retracted position with respect to the sleeve, placing the sleeve over a portion of the second support having an outer diameter generally corresponding to an inner diameter of the sleeve, and contacting the convex article surface with the receiving surface and inactivating the vacuum source of the transfer tool.

12. The method of claim 11, wherein the first support includes a ring-like member extending above the first support surface that has an inner diameter generally corresponding to an outer diameter of the plunger body, and the method includes inserting the plunger body into the ring-like member, while the plunger is extended in respect to the sleeve, to position the tip near the concave article surface.

13. The method of claim 11, wherein the first support includes a concave support surface that generally corresponds in shape to the anterior surface of the lens-shaped article, and the ring-like member is centered with respect to the concave support surface.

14. The method of claim 13, wherein the first support includes a mold member in which the lens-shaped article was cast, such that the lens-shaped article is supported on a concave molding surface of the mold member, and the ring-like member extends above and is centered with respect to the molding surface.

15. The method of claim 11, wherein the second support includes a spindle arbor, such that the lens-shaped article is received on a receiving surface at an end of the arbor, an outer diameter of the arbor body generally corresponding to the inner diameter of the plunger sleeve, and wherein the method includes placing the sleeve over the arbor body to contact the anterior article surface with an end of the arbor.

16. The method of claim 15, wherein the arbor receiving surface includes an O-ring for contacting the convex surface of the article.

17. The method of claim 15, wherein the arbor receiving surface has an opening therein connected to an arbor vacuum source, and wherein the method includes activating the arbor vacuum source when the convex article surface is in contact with the arbor receiving surface.

18. The method of claim 11, wherein the lens-shaped article is a contact lens.

19. A method of transferring a contact lens, a convex surface of said contact lens supported by and centered with respect to a concave support surface of a first support, said method comprising:

(a) transferring the contact lens from the first support to a transfer tool and centering the contact lens with respect to the transfer tool, the transfer tool comprising a plunger comprising an elongated body, a tip at a lower end of the elongated body that has an opening connected to a vacuum source, and a sleeve surrounding the plunger body, wherein a concave surface of the contact lens is contacted with the transfer tool tip while the plunger is in an extended position with respect to the sleeve and the vacuum source is activated; and (b) transferring the contact lens from the transfer tool to a second support and centering the contact lens with respect to a receiving surface of a second support, wherein the convex contact lens surface is contacted with a receiving surface on the second support while the plunger is in a retracted position with respect to the sleeve.

20. The method of claim 19, wherein step (b) further comprises activating a vacuum source connected to the second support receiving surface.

* * * * *